Sept. 16, 1952 — S. S. MADER — 2,610,448
GRINDING MACHINE
Filed Oct. 26, 1949 — 4 Sheets-Sheet 1

INVENTOR
STEWART S. MADER

By Harold W. Eaton
ATTORNEY

Sept. 16, 1952  S. S. MADER  2,610,448
GRINDING MACHINE
Filed Oct. 26, 1949  4 Sheets-Sheet 3

INVENTOR
STEWART S. MADER

BY Harold W. Eaton
ATTORNEY

Sept. 16, 1952 S. S. MADER 2,610,448
GRINDING MACHINE

Filed Oct. 26, 1949 4 Sheets-Sheet 4

INVENTOR
STEWART S. MADER
By Harold W. Eaton
ATTORNEY

Patented Sept. 16, 1952

2,610,448

UNITED STATES PATENT OFFICE 2,610,448

GRINDING MACHINE

Stewart S. Mader, Worcester, Mass., assignor to Norton Company, Worcester, Mass., a corporation of Massachusetts Application October 26, 1949, Serial No. 123,640

2 Claims. (Cl. 51—105)

The invention relates to grinding machines, and more particularly to a fully automatic grinding machine for grinding a predetermined portion of a cylindrical work piece.

One object of the invention is to provide a simple and thoroughly practical automatic grinding machine for automatically grinding a predetermined portion on successive work pieces. Another object is to provide a grinding machine for grinding the end face of an eccentric formed on a cylindrical shaft. Another object is to provide an automatic grinding machine in which the work pieces to be ground are loaded into a magazine and successively fed through a central bore of a rotatable work spindle into a work collet for a grinding operation. Another object is to provide an automatically actuated work stop for locating a work piece in a predetermined position relative to the work supporting collet. Another object is to provide a hydraulically operated loading plunger for transferring successive work pieces from the work magazine into a central bore within the work spindle so as to eject a ground piece of work and to present a new piece of work to be ground.

A further object of the invention is to provide a cycle timing and control mechanism whereby all functions of the machine are automatically interlocked and controlled. Another object is to provide a cycle control mechanism including a master camshaft having a plurality of cams for actuating a plurality of valves and a limit switch successively to control the actuation of the work loading and ejecting plunger, the work locating stop, the work collet, and the wheel feed mechanism so that successive work pieces may be automatically ground to a predetermined size. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

One embodiment of the invention has been illustrated in the drawings, in which:

Fig. 7 is a cross sectional view, on an enlarged scale, through the work spindle and associated parts.

Figure 1:
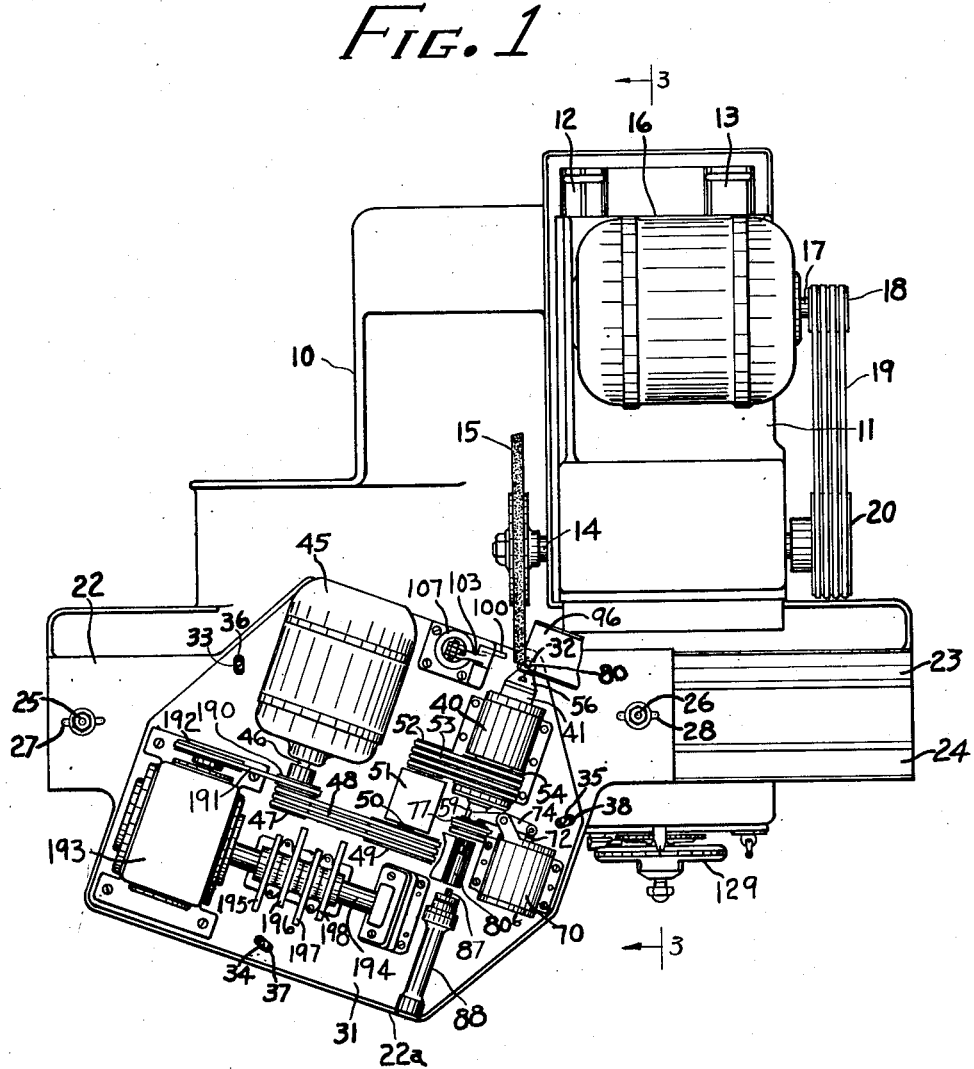
Fig. 1 is a plan view of the improved grinding machine.

A full automatic grinding machine has been illustrated in the drawings comprising a base 10 which supports a transversely movable grinding wheel slide 11 on a V-way 12 and a flat way 13 which are formed on the upper surface of the base 10. The wheel slide 11 serves as a support for a rotatable wheel spindle 14 which is journalled in suitable bearings (not shown) within the wheel slide. The wheel spindle 14 serves as a support for a grinding wheel 15.

An electric motor 16 is mounted on the upper surface of the wheel slide 11 for driving the grinding wheel 15. The motor 16 is provided with an armature shaft 17 having a multiple V-groove pulley 18 which is connected by multiple V-belts 19 with a multiple V-groove pulley 20 mounted on the right hand end of the wheel spindle 14 (Fig. 1).

The base 10 also supports a longitudinally adjustable work supporting table 22 on a V-way 23 and a flat way 24. The table 22 is normally clamped to the base 10 but is adjustable thereon to facilitate setting up the machine for a grinding operation.

Figure 3:
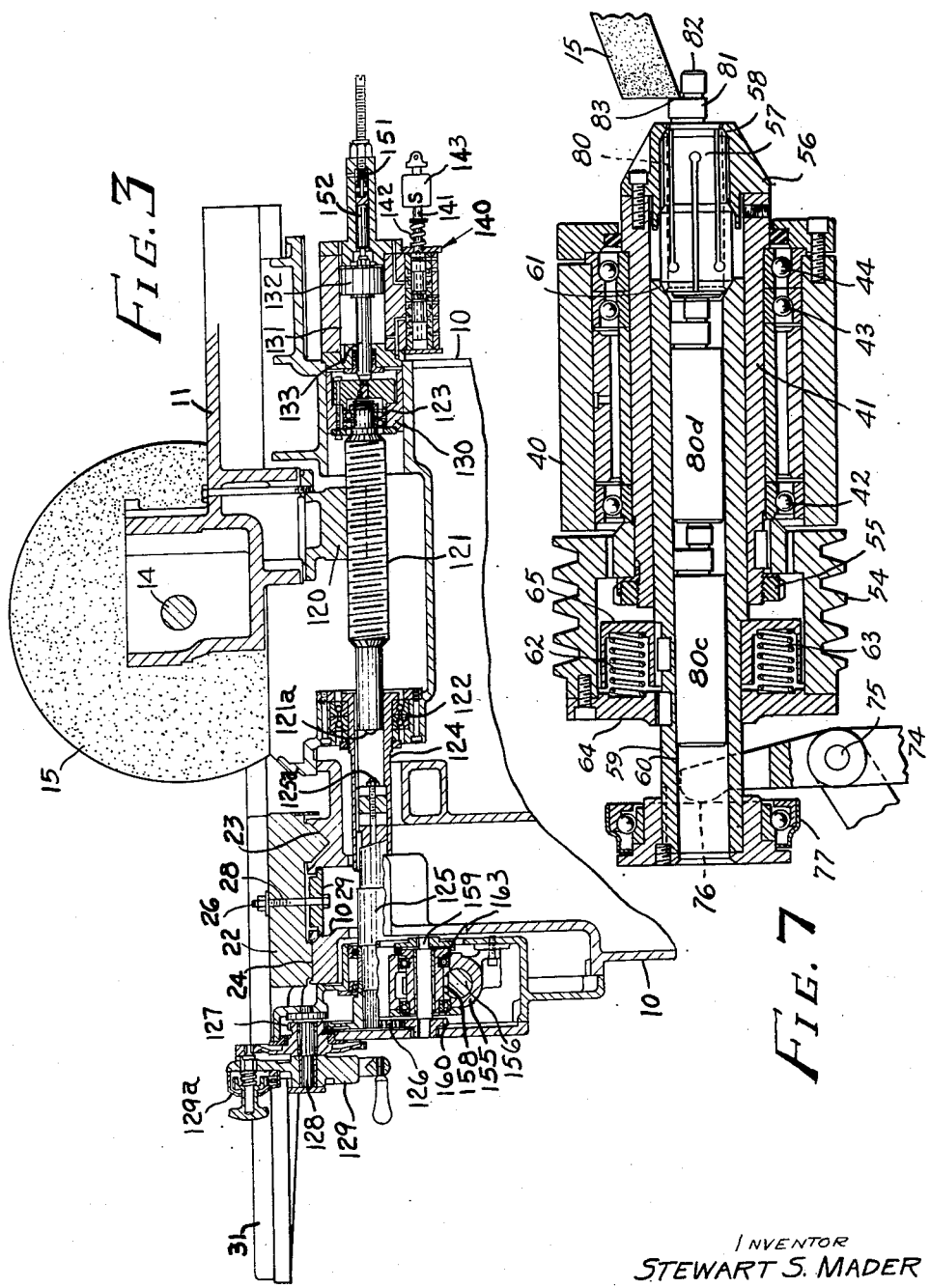
Fig. 3 is a vertical sectional view, on an enlarged scale, taken approximately on the line 3—3 of Fig. 1, through the wheel feeding mechanism.
Figure 4:
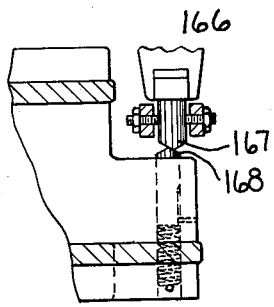
Fig. 4 is a fragmentary detailed view, on an enlarged scale, of the detent for maintaining the feeding mechanism engaged or disengaged.

A suitable clamping mechanism is provided for locking the table 22 in adjusted position. This clamping mechanism may comprise a pair of spaced clamping bolts 25 and 26 (Fig. 1) which pass through elongated slots 27 and 28 respectively formed in the work table 22. The lower end of the clamping bolt 26 is provided with a strap 29 (Fig. 3) which engages inwardly projecting portions of the base 10. A similar strap (not shown) is provided for the clamping bolt 25. It will be readily apparent from the foregoing disclosure that the table 22 may be adjusted longitudinally relative to the base 10 by releasing the clamping bolts 25 and 26, then adjusting the table 22 longitudinally into the desired position after which the clamping bolts 25 and 26 may be again tightened to lock the table 22 in adjusted position relative to the base 10.

The machine as illustrated in the drawings is particularly adapted for grinding an end face on a portion of a work piece such as for example the end face of an eccentric formed integral with a cylindrical shaft. In order to obtain the desired grinding action, it is desirable to utilize a grinding wheel having an angular face of as large an included angle as possible in order that the wheel may present a grinding edge which may grind into the work piece at an angle so that a flat end face on the eccentric portion is obtained. The work piece is preferably rotatably supported on a work supporting mechanism to be hereinafter described which is angularly adjusted so that the axis of rotation of the work piece may be at an angle to a plane normal to the grinding wheel axis. As illustrated in the drawings a swivel plate 31 is pivotally supported on the work table 2 by means of a pivot stud 32. The axis of the pivot stud 32 being located in a plane coinciding with the plane of the side face of the grinding wheel 15. A plurality of clamping screws 33, 34, and 35 pass through elongated arcuate slots 36, 37 and 38 respectively in the swivel plate 31 and are screw threaded into the outwardly extending portion 22a of the work table 22. It will be readily apparent from the foregoing disclosure that the swivel plate 31 may be angularly adjusted by loosening the clamping screws 33, 34 and 35 and then swiveling the swivel plate 31 to the desired position after which the clamping screws 33, 34 and 35 may be again tightened to clamp the plate 31 in the desired adjusted position.

Figure 2:
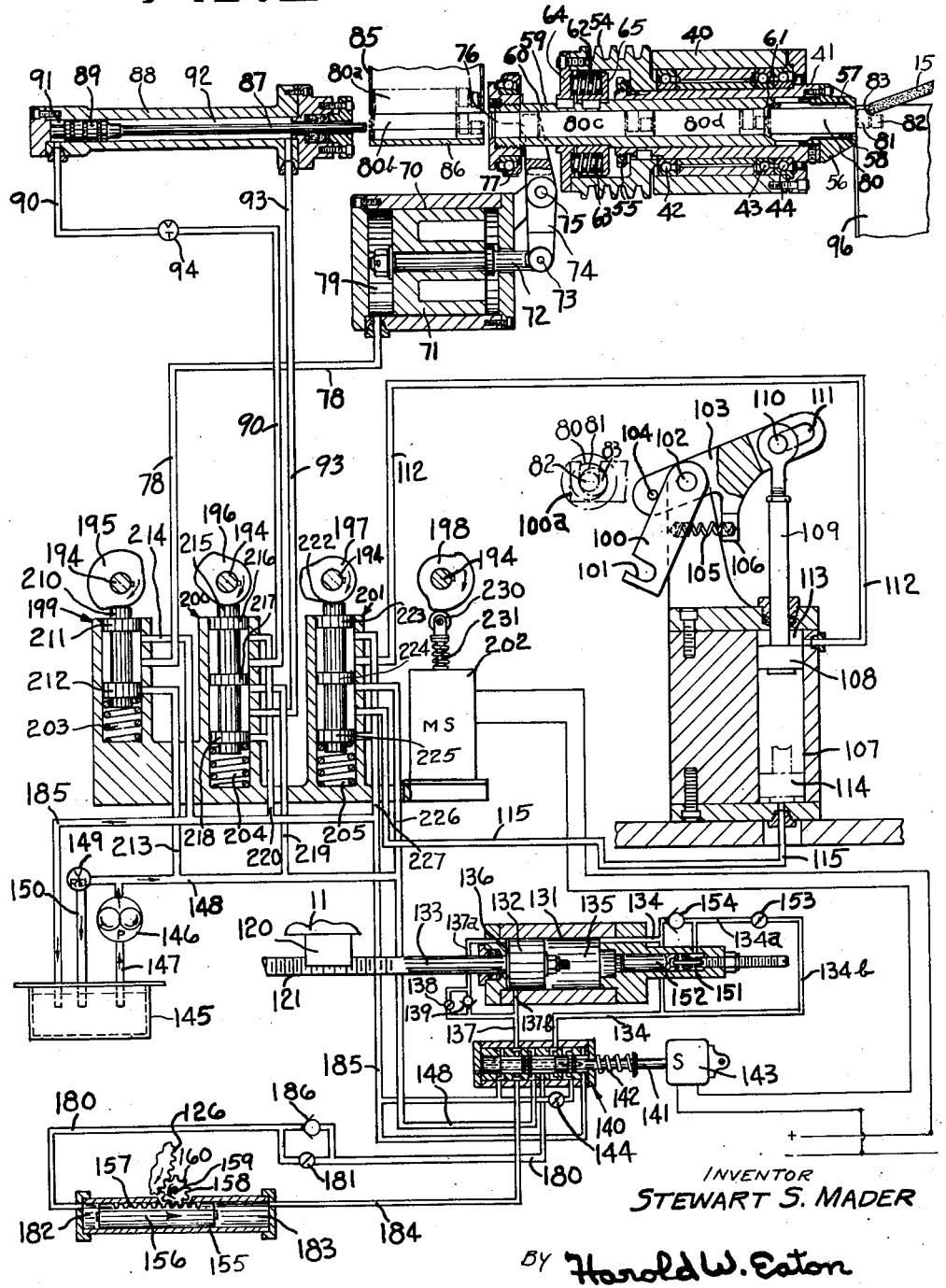
Fig. 2 is a combined sectional view through the work spindle and associated parts, and a hydraulic diagram.

A rotatable work support is provided on the swivel plate 31 comprising a frame 40 which is fixedly secured on the plate by bolts or screws. The frame 40 serves as a support for a rotatable work spindle 41 (Fig. 2). The spindle 41 is journalled in anti-friction bearings 42, 43 and 44. An electric motor 45 is mounted on the swivel plate 31 for driving the spindle 41. The motor 45 is provided with an armature shaft 46 which carries a multiple V-groove pulley 47 which is connected by multiple V-belts 48 with a multiple V-groove pulley 49 mounted on a rotatable shaft 50. The shaft 50 is journalled in suitable bearings (not shown) in a frame 51 which is likewise secured to the upper face of the swivel plate 31. The shaft 50 carries a multiple V-groove pulley 52 which is connected by multiple V-belts 53 with a multiple V-groove pulley 54 which is keyed on the left hand end of the work spindle 41 (Fig. 2). A collar 55 is screw threaded onto the left hand end of the work spindle 41 to lock the pulley 54 in position thereon.

A frusto-conically shaped spindle nose 56 is fixedly mounted on the right hand end of the work spindle 41. The nose 56 serves as a support for a work collet 57. An internal frusto-conical surface 58 formed within the nose 56 serves to engage a correspondingly shaped frusto-conical surface on the work collet 57. A sleeve 59 is slidably supported within a central aperture formed within the work spindle 41. The sleeve 59 is provided with a central aperture or bore 60 through which work pieces pass successively as they are conveyed to the work collet 57. The right hand end of the sleeve 59 is provided with an internal frusto-conically shaped surface 61 which mates with a correspondingly shaped conical surface formed on the left hand end of the work collet 57 (Figs. 2 and 7). The sleeve 59 is normally urged toward the right to clamp a work piece in the collet 57 by means of a plurality of compression springs 62 and 63. The springs 62 and 63 are symmetrically arranged about the sleeve 59 and are interposed between a plate 64 which is keyed on the sleeve 59 and fastened to the left hand face of the pulley 54, and a flanged sleeve 65 which is fixedly keyed on the sleeve 59. The compression of the springs 62 and 63 serve normally to urge the sleeve 59 toward the right so that the frusto-conical face 61 will in cooperation with the frusto-conical face 58 compress the collet 57 to grip the work piece and hold the same during a grinding operation.

A hydraulically operated mechanism is provided for releasing the collet 57. This mechanism may comprise a cylinder 70 having a slidably mounted piston 71. A piston rod 72 is connected to the piston 71 at one end. The other end of the piston rod 72 is connected by a stud 73 with one end of a rock arm 74. The rock arm 74 is pivotally supported on a stud 75. The upper portion of the rock arm is formed as a yoked end 76 having a pair of spaced arms which engage a ball bearing thrust collar 77 which is fixedly mounted on the left hand end of the sleeve 59. When it is desired to release the collet 57, fluid under pressure may be admitted through a pipe 78 into a cylinder chamber 79 to move the piston 71 toward the right (Fig. 2) so as to rock the rock arm 74 in a counterclockwise direction. The counterclockwise movement of the rock arm 74 serves to move the thrust collar 77 toward the left which also moves the sleeve 59 toward the left against the compression of the springs 62 and 63 thereby withdrawing the conical surface 61 and releasing the collet 57.

The machine has been illustrated as set up for grinding a face on a cylindrical work piece 80 which has an eccentric 81 formed integrally therewith. The work piece 80 also has a cylindrical end portion 82 formed integral therewith and adjacent to the right hand end of the eccentric 81. The machine as illustrated is set up for grinding an end face 83 formed on the right hand end of the eccentric 81 (Figs. 2 and 7).

A work magazine 85 is provided to receive a plurality of work pieces 80a which move downwardly in a vertical direction successively into engagement with a loading cradle 86. The loading cradle 86 is provided with an upper partially cylindrical surface which is arranged to support a work piece 80b in axial alignment with the bore 60 within the sleeve 59.

A work loading and ejecting plunger 87 is provided for transferring work pieces successively from the work cradle 86 into the bore 60 so as to automatically eject the ground work pieces 80 and to move a new work piece to be ground into an operative position within the collet 57. The work loading and ejecting plunger 87 is preferably hydraulically actuated by means of a cylinder 88 which contains a slidably mounted piston 89. The piston 89 is fixedly mounted on the end of the work loading and ejecting plunger 87. When fluid under pressure is passed through a pipe 90 into a cylinder chamber 91, the piston 89 is moved toward the right (Fig. 2) to move the plunger 92 toward the right which movement serves to push the work piece 80b into the bore 60. This movement of the work piece 80b serves to advance the work pieces 80c and 80d which are already within the bore 60 toward the right so as to eject the work piece 80 and to position the work piece 80d in an operative position for the next grinding operation. During the movement of the piston 89 toward the right, fluid within a cylinder chamber 92 exhausts through a pipe 93. A throttle valve 94 in the pipe line 90 serves to facilitate regulation of the speed of movement of the piston 89 and the plunger 87.

When the work piece 80 and successive work pieces are ejected from the collet 57, they drop onto a discharge chute 96 which is preferably inclined so that the work pieces may roll out of the machine into a receiving basket or tray (not shown).

To facilitate precise location of the work piece 80 within the collet 57, a suitable stop mechanism is provided which is automatically moved to and from an operative position so that the work piece may be precisely located before being clamped within the collet 57. This mechanism may comprise a stop arm 100 having a U-shaped notch 101. The stop arm 100 is pivotally supported by a stud 102 on a rock arm 103. A stud 104 on the rock arm 103 serves to limit the movement of the stop arm 10 in a clockwise direction relative to the rock arm 103. A compression spring 105 which is interposed between the stop arm 100 and a lug 106 formed integral with the rock arm 103 serves to maintain the stop arm 100 in engagement with the stud 104.

A hydraulically operated mechanism is provided for moving the stop arm 100 to and from an operative position in timed relation with the other functions of the machine. This mechanism may comprise a cylinder 107 which contains a slidably mounted piston 108. The piston 108 is mounted on the lower end of a piston rod 109. The upper end of the piston rod 109 is connected by means of a stud 110 with an elongated slot 11 formed in the right hand end of the rock arm 103. When fluid under pressure is admitted through a pipe 112 into a cylinder chamber 113, the piston 108 together with the parts associated therewith will move in a downward direction to rock the rock arm 103 and the stop arm 100 in a clockwise direction so that the stop arm moves into position 100a. The U-shaped notch 101 is formed so that it will straddle the cylindrical portion 82 on the end of the work piece 80. When the stop arm 100 is in the uppermost or operative position, a work piece 80 when moved by the work loading and ejecting plunger 87 will move toward the right until the end face 83 of the eccentric 81 engages the side face of the stop arm 100. While the work piece is in engagement with the stop arm 100, the work collet is actuated so as to clamp the work piece in position for the next grinding operation.

During the downward movement of the piston 108, fluid within a cylinder chamber 114 may exhaust through a pipe 115 as controlled by a valve mechanism to be hereinafter described. The parts of the stop mechanism are arranged so that engagement of the piston 108 with the bottom of the cylinder 107 serves to position the stop arm 100 so that the U-shaped notch 101 straddles the cylindrical end 82 of the work piece 80. As illustrated in the drawings the piston rod 109 is preferably made in two parts, the upper part being screw threaded into the lower part to facilitate adjustment thereof so as to set up the mechanism and to position the stop arm in a manner above described.

A wheel positioning and feeding mechanism is provided for producing a transverse positioning and feeding movement of the wheel slide 11 and grinding wheel 15 comprising a half nut 120 depending from the underside of the wheel slide 11. The half nut 120 meshes with or engages a rotatable cross feed screw 121 which is journalled at its right hand end (Fig. 3) in an anti-friction bearing 123. The forward end of the feed screw 121 is slidably keyed within a rotatable sleeve 124 which is journalled in an anti-friction bearing 122. A rotatable shaft 125 is slidably keyed within the left hand end of the sleeve 124. A gear 126 mounted on the left hand end of the shaft 125 meshes with a small gear 127 rotatably mounted on a stud 128. A manually operable feed wheel 129 is also rotatably journalled on the stud 128 and is operatively connected to rotate the gear 127. The feed wheel 129 is provided with a micrometer adjusting mechanism 129a which connects the feed wheel 129 to rotate with the gear 127.

In order to facilitate a rapid positioning and receding stroke of the grinding wheel 15 and the wheel slide 11, a hydraulically operated mechanism is provided comprising a cylinder 131 which contains a slidably mounted piston 132. A double end piston rod 133 is connected to the piston 132. The forward or left hand end of the piston rod 133 is connected to a slidably mounted sleeve 130 which also supports the anti-friction bearing 123. When fluid under pressure is passed through a pipe or passage 134 into a cylinder chamber 135, the piston 132 will move rapidly toward the left (Figs. 2 and 3) to cause a rapid positioning movement of the wheel slide 11 and grinding wheel 15. During this movement of the grinding wheel 15, fluid within a cylinder chamber 136 may exhaust through a pipe or passage 137 and through a feed control valve 140. A throttle valve 138 and a ball check valve 139 are provided in the pipe or passage 137 to facilitate control of the movement of the piston 132 in a manner to be hereinafter described.

The feed control valve 140 is preferably a piston type control valve comprising a valve stem 141 having a plurality of valve pistons formed integrally therewith. A compression spring 142 is provided normally to maintain the piston rod 141 in a right hand end position to maintain the wheel slide 11 and the grinding wheel 12 in a rearward or inoperative position. A solenoid 143 is provided for shifting the control valve toward the left into the position illustrated in Fig. 2 when it is desired to cause a forward approaching movement of the grinding wheel 15.

A fluid pressure system is provided for supplying fluid under pressure comprising a reservoir 145. A motor driven fluid pump 146 serves to pump fluid from the reservoir 145 through a pipe 147 and to force fluid under pressure through a pipe 148 to the various mechanisms of the machine. An adjustable relief valve 149 is provided in the pipe line 148 to facilitate exhaust of excess fluid under pressure through a pipe 150 into the reservoir 145 so as to maintain a substantially constant operating pressure.

In order to obtain a precise relatively slow grinding feed of the wheel 15, a suitable mechanism is provided for transmitting a rotary motion to the feed screw 121. This mechanism may comprise a cylinder 155 which contains a slidably mounted piston 156. A rack bar 157 is formed on the upper surface of the piston 156. The rack bar 157 meshes with a gear 158 which is keyed on a rotatable shaft 159. The shaft 159 also supports a gear 160 which meshes with the gear 126. It will be readily apparent from the foregoing disclosure that movement of the piston 156 in either direction will transmit a rotary motion through the gear mechanism above described and thereby to transmit a rotary motion to the feed screw 121.

The forward end of the feed screw 121 is provided with a spherically shaped stop button 121a which is arranged to move into engagement with a rounded end of an adjustable stop screw 125a mounted on the right hand end of the shaft 125. The rapid positioning movement of the grinding wheel 15 and the wheel slide 11 as caused by the piston 132 continues until the stop button 121a engages the end of the stop screw 125a after which the grinding wheel 15 may be fed at a slow rate either by manual rotation of the feed wheel 25 or by the piston and cylinder mechanism above described.

In the operation of the wheel positioning and feeding mechanism, the piston 132 moves forwardly at a rapid rate until the stop button 121a engages the stop screw 125a before the grinding wheel 15 engages the surface of the work piece to be ground. On the forward rapid approaching movement of the piston 132, it is desirable to cushion the rapid approaching movement before the stop button 121a engages the stop screw 125a. This is preferably accomplished by a port 137b which is formed at the end of the passage 137 which is spaced from the left hand end of the cylinder 131 (Fig. 2). It will be readily apparent that when the piston 132 moves a sufficient distance toward the left, the piston 132 will close the port 137b after which fluid may exhaust from the cylinder chamber 136 through a passage 137a, through a needle valve 138 and through the passage 137, through the control valve 140 and out through an exhaust pipe 185 into the reservoir 145. A ball check valve 139 is connected between the passages 137a and 137 so that on the return stroke of the piston 132 to an inoperative or right hand end position (Figs. 2 and 3) substantially unrestricted flow of fluid under pressure from the passage 137 through the passage 137a by-passes the needle valve 138 so as to start a rapid movement of the piston 132 toward the right. This movement of the piston 132 continues until the port 137b is uncovered after which fluid under pressure passes through the port 137b to complete the stroke of the piston 132 to an inoperative position.

When the solenoid 143 is deenergized after a grinding operation has been completed, the feed control valve 140 shifts to a reverse position, that is, toward the right under the influence of the compression of the spring 142 to simultaneously admit fluid under pressure through the passage or pipe 184 into the cylinder chamber 183 to move the piston 156 toward the left (Fig. 2), and through the passage 137 into the cylinder chamber 136 to initiate a rearward movement of the piston 132 toward the right to an inoperative position.

Due to the fact that less power is required to move the piston 156, it moves toward the left to rotate the feed screw 121 in the reverse direction so as to reset the feed wheel 129 into its initial position before starting the rapid rearward movement of the piston 132 toward an inoperative or rearward position.

A throttle valve 144 is provided in the pipe line 185 to facilitate regulation of the rate of fluid exhausting from the cylinder chamber 135 so as to control the rapid rearward movement of the piston 32 and the grinding wheel 15 and its supporting slide 11. During the initial rearward movement of the piston 132, fluid exhausting from the cylinder chamber 135 through the passage 134 opens the ball check valve 154 and passes into the dash pot cylinder 151 so as to refill the dash pot cylinder and to return the dash pot piston to its initial position that is its left hand end position so that it is ready for the next cushioning operation at the end of the rearward stroke of the piston 132.

When the grinding wheel 15 is moved to an extreme rearward position, it is desirable to provide an automatic cushioning mechanism for retarding the rearward movement of the piston 132 as it approaches the end of its rearward stroke. An end portion on the right hand end of the piston rod 133 moves into engagement with the left hand end of a dash pot piston 152. A dash pot cylinder 151 is provided on the right hand end of the cylinder 131 which surrounds the dash pot piston 152. Fluid exhausts from the dash pot cylinder through a passage 134a, through a needle valve 153, through a passage 134b which connects with a passage 134 so that fluid exhausting from the dash pot cylinder will pass through the control valve 140 and out through the exhaust pipe 185. The setting of the needle valve 153 will determine the rate of rearward movement of the piston 132 as it approaches the end of its stroke thereby reducing the rapid movement to a slow movement so as to prevent undue shocks and vibrations in the machine. A ball check valve 154 is connected between the passage 134 and the passage 134a so that when fluid under pressure is passed through the passage 134 into the cylinder chamber 135 to cause a rapid approaching movement of the piston 132, fluid may also pass through the ball check valve 154, through the passage 134a into the dash pot cylinder 151 to return the dash pot piston 152 to its forward position so that it is ready for the next cycle of operation. It will be readily apparent from the foregoing disclosure that the grinding wheel may be rapidly moved to and from an operative position by admitting fluid under pressure to either the cylinder chamber 135 or the cylinder chamber 136 which serves to move the grinding wheel 15 and the grinding wheel slide 11 rapidly up to the position where it is about to engage the periphery of the work piece to be ground.

The control valve 140 admits fluid under pressure simultaneously to the cylinder 131 and the cylinder 155 so that a rapid movement of the piston 132 and a movement of the piston 156 is simultaneously initiated. As above explained, the rapid approaching movement of the piston 132 continues until the stop button 121a engages the stop screw 125a after which continued movement of the piston 156 serves to rotate the feed screw 121 at a slow rate of speed to product a fine grinding feed as determined by the setting of the needle valve 181. The slow infeed of the grinding wheel continues until a stop abutment 176 on the feed wheel 129 moves into engagement with a stop pawl 175 which is pivotally supported by a stud 178 on the front of the machine base.

It will be readily apparent from the foregoing disclosure that when the feed control valve 140 is shifted to cause a rearward rapid movement of the grinding wheel 15 and the wheel slide 11 as caused by the piston 132, fluid under pressure will be simultaneously admitted to the cylinder 155 to rotate the feed screw 121 in the reverse direction thereby resetting the slow feeding mechanism for the next grinding operation.

Figure 5:
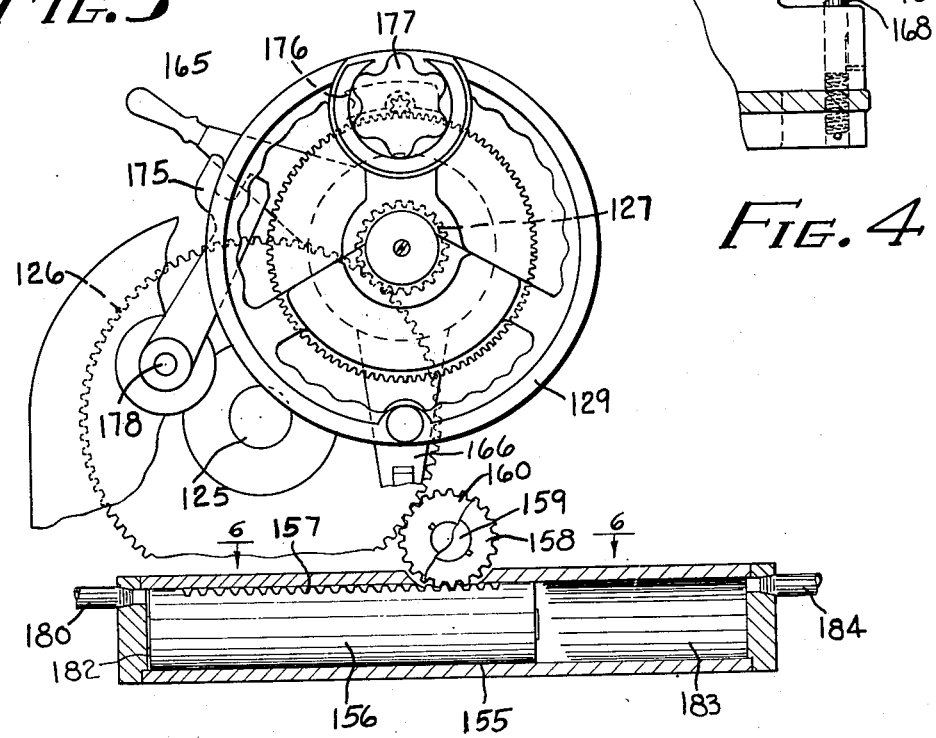
Fig. 5 is a fragmentary front elevation, on an enlarged scale, of the wheel feeding mechanism.
Figure 6:
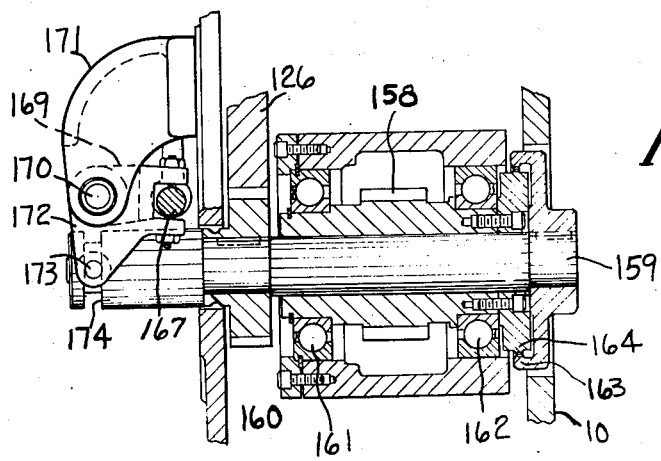
Fig. 6 is a fragmentary sectional view, on an enlarged scale, taken approximately on the line 6—6 of Fig. 5, through the feed mechanism clutch.

To facilitate setting up the feeding mechanism of the machine when a new wheel is mounted thereon or to set up for a different diameter workpiece, it is desirable to provide means for disconnecting the feed wheel 129 from the power actuated mechanism. This is preferably accomplished by means of a clutch mechanism whereby the fluid motor may be disconnected from the feed wheel 129 and the feed screw 121. This mechanism may comprise a manually operable lever 165 which is rotatably supported in back of the feed wheel 129. The lever 165 is provided with a downwardly extending arm 166 having a cylindrical arrow-pointed end portion 167 which is arranged to engage a spring-pressed detent 168 which serves to hold the lever 165 either in a clutched or declutched position. A pivotally mounted bell crank lever 169 is supported by a vertical stud 170 (Fig. 6). The stud 170 is carried by a bracket 171 which is fixedly mounted on the front of the machine base 10. The bell crank lever 169 is provided with a yoked portion having a pair of opposed screws 172 and 172a which are arranged to engage diametrically opposite sides of the arrow-pointed projection 167 of the arm 166. The bell crank lever 169 is also provided with a second yoked portion 172 which carries diametrically arranged studs 173 and 173a. The studs 173 and 173a are arranged to engage a groove 174 formed in an enlarged sleeve which is fixedly mounted on the forward end of the shaft 159. A clutch member 163 is keyed to the inner end of the shaft 159. The clutch member 163 comprises an internal gear which is arranged to mesh with an external gear 164 of the same pitch diameter which is fixedly mounted relative to the gear 158. In the position shown in Fig. 6, the clutch members 163 and 164 are engaged so that any movement of the piston 156 will be transmitted through the rack 157, the gear 158, the clutch parts 163—164, the shaft 159, the gear 160 to rotate the gear 126 which will transmit a rotary feeding movement to the feed screw 121 and also to the feed wheel 129. If it is desired to declutch the piston 156 from the feed screw 121 and the feed wheel 129, the clutch lever 165 is rocked in a clockwise direction (Fig. 5) to rock the bell crank lever 169 in a counterclockwise direction (Fig. 6) so as to move the shaft 159 toward the right (Fig. 6) so as to disengage the clutch member 163 from the clutch member 164. In this position of the clutch parts, the feed wheel 129 may be manually rotated to rotate the feed screw 121 and rapidly to position the grinding wheel 15 as desired.

A suitable cycle timing and controlling mechanism is provided for synchronously controlling the various mechanisms above described. As illustrated in the drawings the armature shaft 46 is provided with a V-groove pulley 190 which is connected by means of a V-belt 191 with a V-groove pulley 192 on a gear reducer unit 193. The gear reducer unit 193 may be of any of the standard well known gear reduction units to impart a relatively slow rotary motion to a master camshaft 194. The master camshaft 194 supports a plurality of cams 195, 196, 197 and 198 which are arranged to actuate a collet release control valve 199, a loading plunger control valve 200, a work stop control valve 201, and a limit switch 202 respectively. A plurality of springs 203, 204, and 205 are provided for maintaining the valves in operative engagement with the cams 196, 197 and 198. The collet release control valve 199 comprises a valve stem 210 having a pair of spaced valve pistons 211 and 212 formed integrally therewith. A pipe 213 connects the fluid pressure pipe line 148 with the valve 199. A pipe 214 connects the valve 199 with the exhaust pipe 185. It will be readily apparent that when the cam 195 causes a downward movement of the valve stem 210, fluid under pressure passing through the pipe 213 will pass into a valve chamber located between the valve pistons 211 and 212 and pass through the pipe 78 into the cylinder chamber 79 to cause the sleeve 59 to move toward the left thereby releasing the work collet 57.

The loading plunger control valve 200 comprises a valve stem 215 having valve pistons 216, 217 and 218 formed integrally therewith. A pipe 219 connects the pressure pipe 148 with the valve 200. A pipe 220 connects the valve 200 with the exhaust pipe 185. It will be readily apparent that when the cam 196 causes a downward movement of the valve stem 215, fluid under pressure passing through the pipe 219 will pass through a valve chamber located between the valve pistons 216 and 217 and pass out through the pipe 90 into the cylinder chamber 91 to cause the loading plunger 87 to move toward the right to shift a new piece of work into the bore 60 within the spindle 59 and thereby to eject a ground work piece and to position a new work piece to be ground.

The work stop control valve 201 comprises a valve stem 222 having valve pistons 223, 224 and 225 formed integrally therewith. A pipe 226 connects the pressure pipe 148 with the valve 201. A pipe 227 connects the valve 201 with the exhaust pipe 185. It will be readily apparent that when the valve stem 222 is depressed by the rotation of the cam 197, fluid under pressure passing through the pipe 226 will enter a valve chamber located between the valve pistons 223 and 224 and pass out through the pipe 112 into the cylinder chamber 113 to cause a downward movement of the piston 108 so as to swing the stop arm 100 in a clockwise direction into an operative position so as to determine and locate the new piece of work to be ground in a predetermined position relative to the work collet 37.

A roller 230 is mounted on the upper end of a switch actuating plunger 231 for actuating the limit switch 202. When the cam 198 depresses the roller 230 (as shown in Fig. 2), the downward movement thereof closes the limit switch 202 thereby energizing the solenoid 143 to move the valve stem 141 of the control valve 140 toward the left into the position illustrated so that fluid under pressure from the pump 146 passing through the pipe 148, through the control valve 140 passes through the passage 134 into the cylinder chamber 135 to cause the piston 132 to move toward the left (Figs. 2 and 3) to cause a forward approaching movement of the grinding wheel 15 and wheel slide 11.

The operation of this improved grinding machine will be readily apparent from the foregoing disclosure. The grinding wheel is set in motion by the starting motor 16 and the work spindle is started by starting the electric motor 45 which runs continuously during the entire grinding operation. The work pieces 80 being fed through the spindle automatically in a manner above described while the work supporting spindle 41 is continuously rotated. Work pieces 80a are loaded into the magazine or hopper 85 and move successively onto the work loading tray 86 in axial alignment with the bore 60 in the sleeve 59. The continuous rotation of the camshaft 194 and the cams 195, 196, 197 and 198 actuates the valves 199, 200, 201 and the limit switch 202 to produce an automatic cycle of operation so that work pieces are positioned precisely within the work collet 57 which is then clamped to support the work piece during a grinding operation after which the collet is released and the loading plunger 87 moved toward the right to insert a work piece 80b within the bore 60 of the sleeve 59 and at the same time to automatically eject the ground work piece 80 and to move the work piece 80d into an operative position for the next grinding operation. The stop arm 100 is operated automatically, it being raised into an operative position after one work piece has been ejected to locate the next work piece precisely relative to the collet 57. The wheel feeding movement of the grinding wheel 15 is automatically timed and controlled by actuation of the limit switch 202 and the solenoid 143 so that work pieces are successively loaded, ground, and thereafter ajected from the machine.

It will thus be seen that there has been provided by this invention apparatus in which the various objects hereinbefore set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a transversely movable wheel slide thereon, a rotatable grinding wheel on said slide, a swivel plate adjustably mounted on said base, a rotatable work support on said plate including a hollow spindle thereon, means including a motor continuously to rotate said spindle, a work collet in the forward end of said spindle, a hollow sleeve slidably keyed within said spindle, means including a piston and cylinder to actuate said sleeve to clamp and release said collet, a cam-actuated control valve therefor, a central bore within said sleeve to facilitate conveying work pieces to said collet, means including a piston and cylinder to feed said grinding wheel toward and from said collet to grind a work piece to a predetermined size, a solenoid-actuated control valve, a cam-actuated limit switch therefor, a work loading magazine for supporting a plurality of work pieces to be ground, a work loading tray to receive successive work pieces from said magazine and to position them in axial alignment with the bore in said sleeve, means including a reciprocable plunger to feed successive work pieces from said tray through the hollow spindle into the collet, means including a piston and cylinder to actuate said plunger so as to feed a work piece to be ground into said collet and to eject a ground work piece therefrom, a cam-actuated control value therefor, means including a movable work locating stop to locate successive work pieces in a predetermined position within said collet for a grinding operation, a piston and cylinder means to move said stop to and from an operative position, a cam-actuated control value therefor and a cycle control synchronously to actuate said valves and said limit switch so as to control actuation of said work feed plunger, actuation of said work locating stop, actuation of said collet, and actuation of said wheel feed so as to produce an automatic cycle of operation.

2. In a grinding machine having a base, a transversely movable wheel slide thereon, a rotatable grinding wheel on said slide, a swivel plate adjustably mounted on said base, a rotatable work support on said plate including a hollow spindle thereon, means including a motor continuously to rotate said spindle, a work collet in the forward end of said spindle, a hollow sleeve slidably keyed within said spindle for actuating said collet, compression springs normally to actuate said sleeve to close said collet, means including a piston and cylinder to actuate said sleeve to clamp and release said collet, a central bore within said sleeve to facilitate conveying work pieces to said collet, means including a piston and cylinder to feed said grinding wheel toward and from said collet to grind a work piece to a predetermined size, a work loading magazine for supporting a plurality of work pieces to be ground, a work loading tray to receive successive work pieces from said magazine, and to position them in axial alignment with the bore in said sleeve, means including a reciprocable plunger to feed successive work pieces from said tray through the hollow spindle into the collet during continuous rotation of the spindle, means including a piston and cylinder to actuate said plunger so as to feed work piece to be ground into said collet and to eject a ground work piece therefrom, means including a pivotally mounted work locating stop to locate successive work pieces in a predetermined position within said collet for a grinding operation, means including a piston and cylinder to swing said stop to and from an operative position to facilitate ejection of the workpieces from said collet, and a cycle control mechanism automatically to control the admission to and exhaust of fluid from said cylinders so as to produce an automatic cycle of operation.

STEWART S. MADER.

REFERENCES CITED

The following references are of record in the file of this patent:

UNITED STATES PATENTS

| Number | Name | Date |
|---|---|---|
| 2,092,895 | Stevens | Sept. 14, 1937 |
| 2,191,930 | Arms et al. | Feb. 27, 1940 |
| 2,311,213 | Cramer | Feb. 16, 1943 |
| 2,475,091 | Hackman | July 5, 1949 |